(12) United States Patent
Shin

(10) Patent No.: US 8,580,356 B2
(45) Date of Patent: Nov. 12, 2013

(54) METHOD OF FABRICATING ALIGNMENT LAYER FOR LIQUID CRYSTAL DISPLAY DEVICE

(75) Inventor: Dong-Cheon Shin, Seoul (KR)

(73) Assignee: LG Display Co., Ltd., Seoul (KR)

( * ) Notice: Subject to any disclaimer, the term of this patent is extended or adjusted under 35 U.S.C. 154(b) by 671 days.

(21) Appl. No.: 12/003,776

(22) Filed: Dec. 31, 2007

(65) Prior Publication Data
US 2008/0231786 A1 Sep. 25, 2008

(30) Foreign Application Priority Data

Mar. 21, 2007 (KR) .................. 10-2007-0027690

(51) Int. Cl.
*B05D 3/02* (2006.01)
*B05D 3/06* (2006.01)
*H05B 3/00* (2006.01)

(52) U.S. Cl.
USPC ........... 427/558; 427/379; 427/543; 427/545; 427/553; 427/557

(58) Field of Classification Search
USPC .................. 427/558, 379, 543, 545, 553, 557
See application file for complete search history.

(56) References Cited

U.S. PATENT DOCUMENTS

| | | | | |
|---|---|---|---|---|
| 5,053,480 A | * | 10/1991 | Koto et al. | 528/188 |
| 5,612,450 A | * | 3/1997 | Mizushima et al. | 528/353 |
| 5,807,498 A | * | 9/1998 | Gibbons et al. | 252/299.4 |
| 5,850,273 A | * | 12/1998 | Terashita et al. | 349/129 |
| 5,958,293 A | * | 9/1999 | Gibbons et al. | 252/299.4 |
| 6,893,688 B2 | * | 5/2005 | Nakahara | 427/553 |
| 2002/0149938 A1 | | 10/2002 | Allen | |
| 2004/0155844 A1 | | 8/2004 | Stopa | |
| 2004/0259326 A1 | * | 12/2004 | Hideo | 438/458 |

FOREIGN PATENT DOCUMENTS

| | | |
|---|---|---|
| JP | 2000-187221 | 7/2000 |
| KR | 10-2000-0005064 A | 1/2000 |
| KR | 10-2004-0058713 A | 7/2004 |
| KR | 10-2006-0114580 A | 11/2006 |
| TW | 455730 | 9/2001 |
| TW | I230841 | 4/2005 |

\* cited by examiner

*Primary Examiner* — Michael Wieczorek
(74) *Attorney, Agent, or Firm* — McKenna Long & Aldridge LLP

(57) ABSTRACT

A method of fabricating an alignment layer for a liquid crystal display device includes forming an alignment material layer on a substrate by coating an alignment material, irradiating UV rays onto the alignment material layer and pre-baking the alignment material layer; and post-baking the alignment material layer.

5 Claims, 8 Drawing Sheets

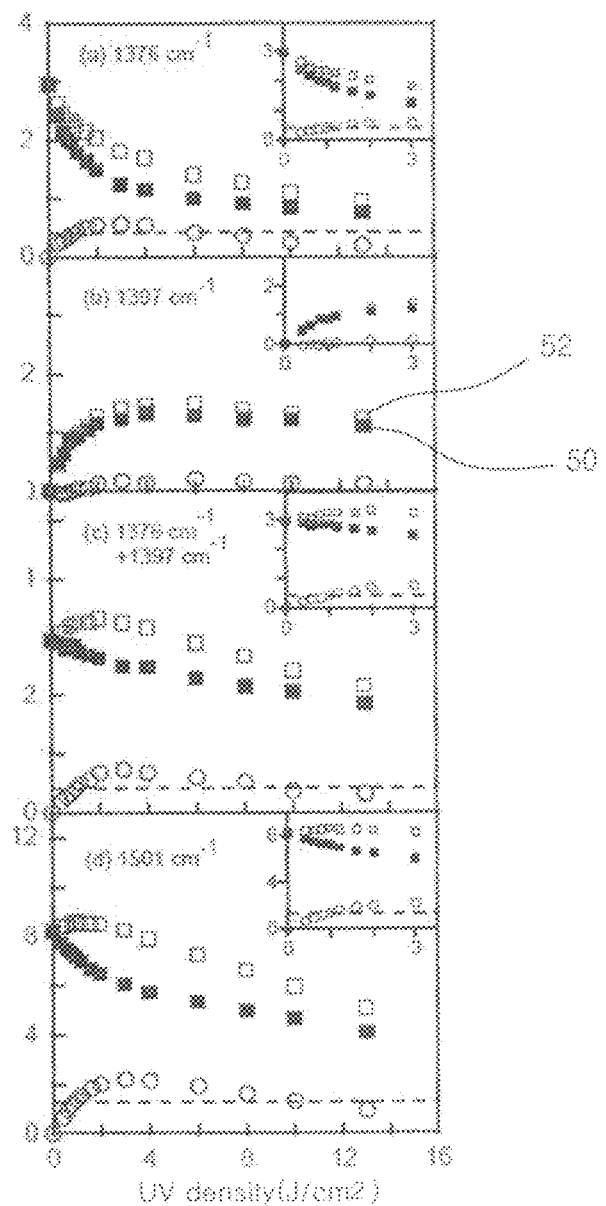

METHOD OF FABRICATING ALIGNMENT LAYER FOR LIQUID CRYSTAL DISPLAY DEVICE

This application claims the benefit of Korean Patent Application No. 10-2007-0027690, filed on Mar. 21, 2007, which is hereby incorporated by reference for all purposes as if fully set forth herein.

BACKGROUND OF THE INVENTION

1. Field of the Invention

The present invention relates to a liquid crystal display (LCD) device and more particularly to a method of fabricating an alignment layer for an LCD device.

2. Discussion of the Related Art

The related art LCD devices use an optical anisotropic property and polarization properties of liquid crystal molecules to display images. The liquid crystal molecules have orientation characteristics of arrangement resulting from their thin and long shape. Thus, an arrangement direction of the liquid crystal molecules can be controlled by applying an electrical field to them. Accordingly, when the electric field is applied to them, polarization properties of light is changed according to the arrangement of the liquid crystal molecules such that the LCD devices display images. At least one alignment layer is formed to determine an initial orientation of the liquid crystal molecules.

FIG. 1 is a schematic perspective view of a related art LCD device, and FIG. 2 is a schematic cross-sectional view of a related art LCD device.

Referring to FIGS. 1 and 2, an LCD device includes an array substrate B1, a color filter substrate B2 and a liquid crystal layer 40 interposed therebetween. In the array substrate B1, a gate line 12, a data line 24, a thin film transistor (TFT) T and a pixel electrode 28 are formed on a first substrate 10. The gate and data lines 12 and 24 cross each other to define the pixel region P, and the TFT T is formed at a crossing portion of the gate and data lines 12 and 24. The pixel electrode 28 in each pixel region P is connected to the TFT T and receives voltages through the TFT T. The TFT T includes a gate electrode 14, a gate insulating layer 16, a semiconductor layer 18 including an active layer 18a and an ohmic contact layer 18b, a source electrode 20 and a drain electrode 22. The gate electrode 14 is connected to the gate line 12, and the semiconductor layer 18 on the gate insulating layer 16 corresponds to the gate electrode 14. The source and drain electrodes 20 and 22 are disposed on the semiconductor layer 18 and spaced apart from each other. The source electrode 20 is connected to the data line 24. A passivation layer 26 exposing a portion of the drain electrode 22 is formed over the TFT T, and the pixel electrode 28 is formed on the passivation layer 26 such that the pixel electrode 28 is connected to the portion of the drain electrode 22. In addition, a first alignment layer 42 of polyimide is formed on an entire surface of the first substrate 10 having the pixel electrode 28.

In the color filter substrate B2, a black matrix 32, a color filter layer 34 and a common electrode 36 are formed on a second substrate 30 facing the first substrate 10. The black matrix 32 is formed on the second substrate 30 and has a lattice shape. The black matrix 32 corresponds to a non-display region of the first substrate 10. The non-display region of the first substrate 10 includes the gate line 12, the data line 24 and the TFT T. The color filter layer 34 includes sub-color filters 34a, 34b and 34c, and each of the sub-color filters 34a, 34b and 34c having one of red (R), green (G), and blue (B) colors corresponds to each pixel region P. Although not shown, a planarization layer is formed on the black matrix 32 and the color filter layer 34. The common electrode 36 is formed over the black matrix 32 and the color filter layer 34. The common electrode 36 generates an electric field with the pixel electrode 28 such that the liquid crystal layer 40 is driven by the electric field. In addition, a second alignment layer 44 is formed on the common electrode 36.

The alignment layers are formed to determine an initial orientation of liquid crystal molecules of the liquid crystal layer. Orientation process, which is divided into a contact type and a non-contact type, is performed to give the alignment layers orientation properties. In the contact type orientation process, a rubbing cloth is used. There is a physical friction between the alignment layer and the rubbing cloth to form a plurality grooves on a surface of the orientation layer. Due to the grooves, the alignment layer has the orientation properties, and the liquid crystal molecules have a pre-determined orientation. On the other hand, in the non-contact type orientation process, an optical reaction is performed onto the alignment layer to give the alignment layer anisotropic properties. The liquid crystal molecules have a pre-determined orientation due to the anisotropic properties.

Unfortunately, because additional processes, such as changing the rubbing cloth, are required in the contact type orientation process, the contact type orientation process makes production costs of the LCD device increasing. Accordingly, the non-contact type orientation process is the subject of significant research and development. Particularly, when multi domains, where the alignment layer is rubbed to have different initial orientations, are required in one pixel region, the non-contact type orientation process is widely used.

In the non-contact type orientation process, the alignment layer is formed from a polyimide resin including an optical functional group. For example, the optical function group includes cyclobutane dianhydride (CBDA).

FIG. 3 shows a structure of a polyimide resin used for forming an alignment layer according to the related art. Generally, polyimide is a polymeric material having an imide ring and synthesized from an aromatic anhydride and diamine. Particularly, photoreaction imide has an optical functional group, such as a cyclobutane dianhydride (CBDA) ring in FIG. 3. When ultraviolet (UV) rays is irradiated, the cyclobutane dianhydride (CBDA) ring is opened such that the photoreaction imide having the optical functional group is resolved into maleimide (MI) and a photo-oxide reactant.

FIG. 4 shows structures of a polyimide resin, which has a cyclobutane dianhydride (CBDA) ring and an oxi-dianiline (ODA) group before and after UV RAY irradiating, and FIG. 5 is a graph showing dichroism and absorbance of a polyimide resin.

Referring to FIGS. 4 and 5, when UV RAY is irradiated onto the polyimide having the cyclobutane dianhydride (CBDA) ring and the oxi-dianiline (ODA) group, the CBDA ring is opened such that maleimide (MI) and the photo-oxide reactant are generated. In FIG. 4, 1376 $cm^{-1}$, 1240 $cm^{-1}$ and 1501 $cm^{-1}$ represent infrared absorption bands. It is possible to measure the infrared absorption band using a fourier transformation infrared (FT-IR) spectroscopy. Maleimide (MI) obtained by UV RAY irradiating has an infrared absorption band of 1397 $cm^{-1}$. Moreover, as shown in FIG. 5, an infrared absorbance curve 50 and a dichroism curve 52 of maleimide (MI) having the infrared absorption band of 1397 $cm^{-1}$ are overlapped to each other. The infrared absorbance curve 50 and the dichroism curve 52 of maleimide (MI) are shown in (b) of FIG. 5. It is interpreted that maleimide (MI) has directionless properties and does not affect properties of the alignment layer.

In addition, when polyimide is photodecomposited, not only a main reaction producing maleimide (MI) but also a side reaction producing undesired products is generated. The side reaction reduces a molecular weight of polyimide such that the heat-resisting property of the alignment layer of polyimide is degraded. Accordingly, the LCD device having the related art photo-oriented alignment layer, there are some problems such as after images.

SUMMARY OF THE INVENTION

Accordingly, the present invention is directed to a method of fabricating an alignment layer for an LCD device that substantially obviates one or more of the problems due to limitations and disadvantages of the related art.

An advantage of the present invention is to provide an improved method of fabricating an alignment layer.

Additional features and advantages of the invention will be set forth in the description which follows, and in part will be apparent from the description, or may be learned by practice of the invention. These and other advantages of the invention will be realized and attained by the structure and method particularly pointed out in the written description and claims hereof as well as the appended drawings.

To achieve these and other advantages and in accordance with the purpose of the present invention, as embodied and broadly described herein, a method of fabricating an alignment layer for a liquid crystal display device includes forming an alignment material layer on a substrate by coating an alignment material; irradiating UV rays onto the alignment material layer, thereby pre-baking the alignment material layer; and post-baking the alignment material layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 5 is a graph showing dichroism and absorbance of a polyimide resin.

DETAILED DESCRIPTION OF THE ILLUSTRATED EMBODIMENTS

Reference will now be made in detail to the embodiments of the present invention, examples of which are illustrated in the accompanying drawings.

Figure 1:
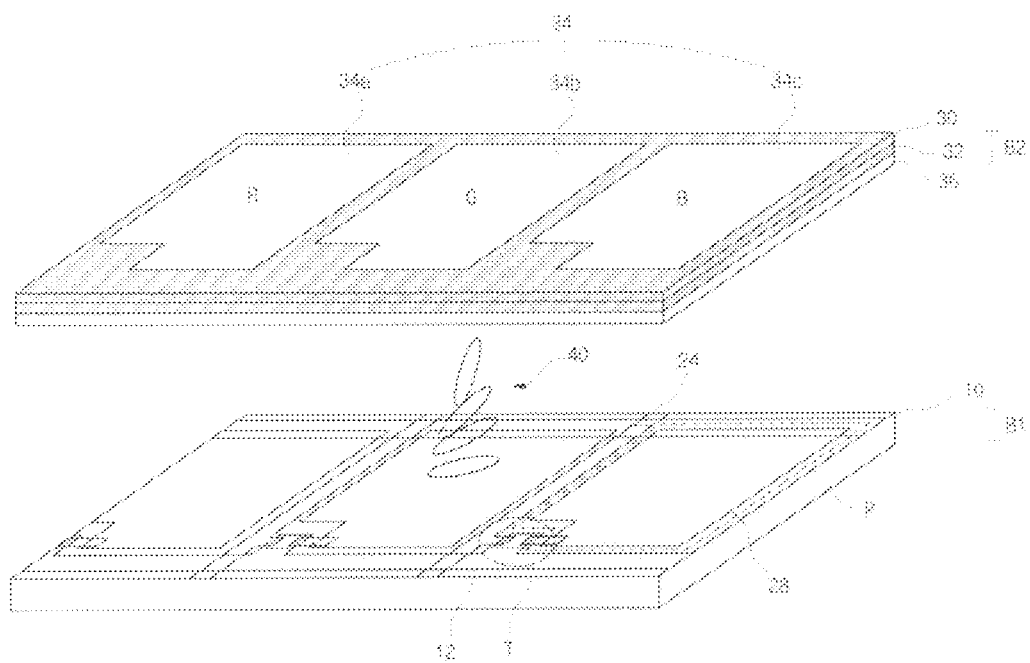
FIG. 1 is a schematic perspective view of a related art LCD device.
Figure 2:
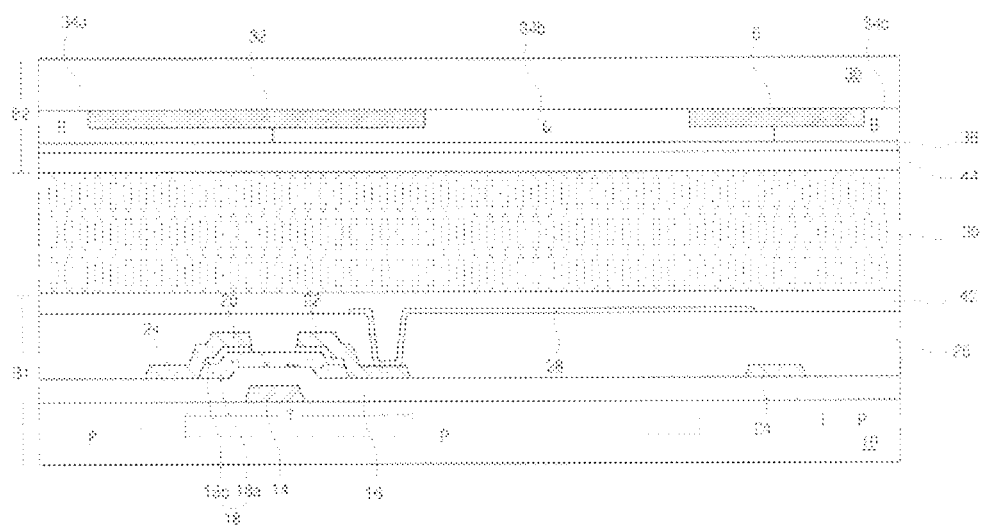
FIG. 2 is a schematic cross-sectional view of a related art LCD device.
Figure 3:
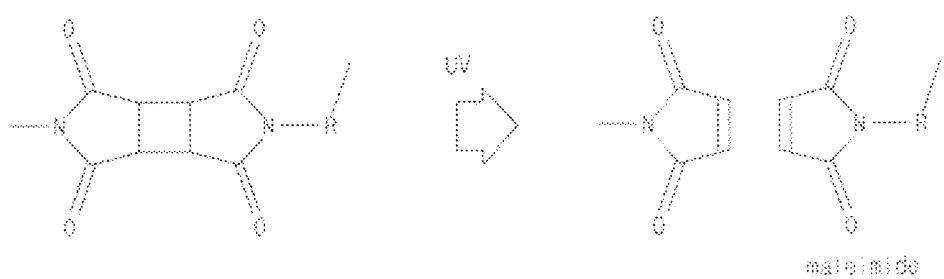
FIG. 3 illustrates a structure of a polyimide resin used for forming an alignment layer according to the related art.
Figure 4:
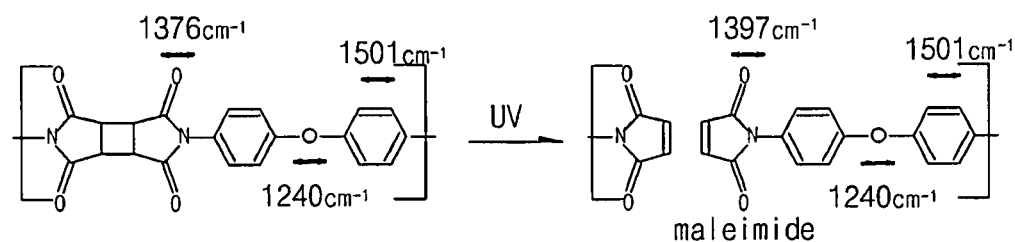
FIG. 4 illustrates structures of a polyimide resin having a cyclobutane dianhydride (CBDA) ring and an oxi-dianiline (ODA) group before and after UV RAY irradiating.

An alignment material for a method of fabricating an alignment layer includes a polyimide resin having a cyclobutane dianhydride (CBDA) ring of FIG. 3. A method for obtaining an alignment layer having improved properties is explained with FIGS. 6A to 6C.

Figure 6A:
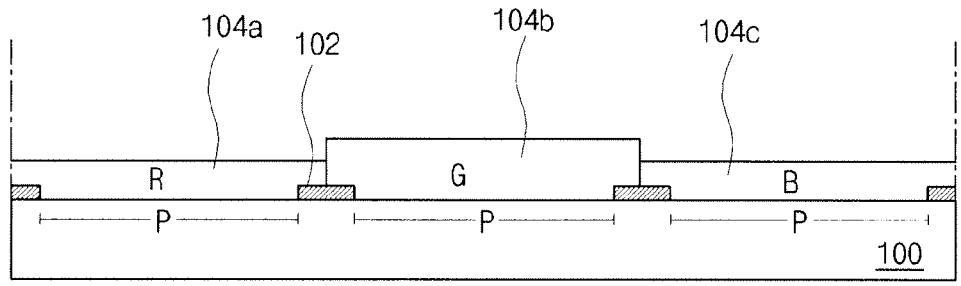
FIGS. 6A, 6B and 6C illustrate fabricating processes of a color filter substrate having an alignment layer according to the present invention.
Figure 6B:
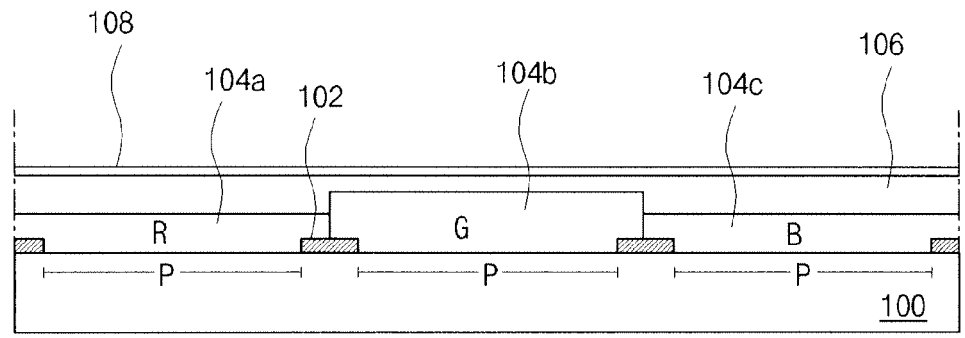
Figure 6C:
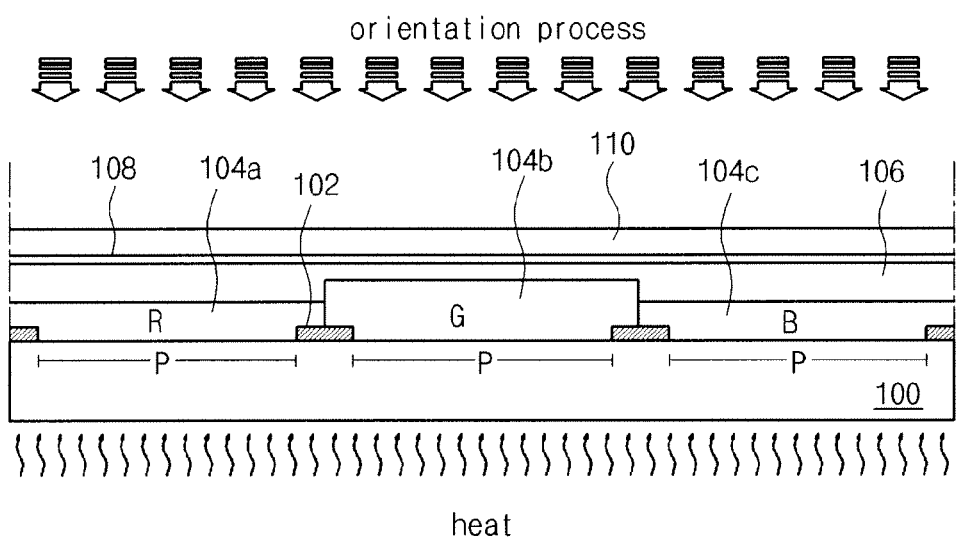

FIGS. 6A to 6C show fabricating processes of a color filter substrate having an alignment layer according to the present invention.

First, in FIG. 6A, a black matrix 102 is formed on a substrate 100 having a plurality of pixel regions P. The black matrix 102 has a lattice shape corresponding to each pixel region P. Although not shown, an LCD device has a counter substrate. On the counter substrate, a gate line, a data line and a thin film transistor are formed, and the black matrix 102 corresponds to them. Next, red (R), green (G) and blue (B) color filter patterns 102a, 102b and 102c are formed on the substrate 100 having the black matrix 102. Each of the red (R), green (G) and blue (B) color filter patterns 102a, 102b and 102c corresponds to each pixel region P. In more detail, a color resin is coated on an entire surface of the substrate 100 having the black matrix 102 and then patterned a color resin layer to form one of the red (R), green (G) and blue (B) color filter patterns 102a, 102b and 102c. For example, the red (R) color filter patterns 102a are disposed at a first pixel line, the green (G) color filter patterns 102b are disposed at a second pixel line, and the blue (B) color filter patterns 102c are disposed at a third pixel line. This is referred to as a stripe type. Considering color purities and electrical properties, the red (R), green (G) and blue (B) color filter patterns 102a, 102b and 102c have different thickness.

Accordingly, as shown in FIG. 6B, a planarization layer 106 is formed on the red (R), green (G) and blue (B) color filter patterns 102a, 102b and 102c to form a flat top surface. The planarization layer may be formed of an insulating polymer resin. Next, a common electrode 108 is formed on the planarization layer 106. The common electrode 108 includes a transparent conductive material, such as indium-tin-oxide (ITO) and indium-zinc-oxide (IZO). If the color filter substrate is used for an LCD device having in-plane switching (IPS) mode, the common electrode is not required.

As shown in FIG. 6C, an alignment material layer (not shown) is formed on the common electrode 108, and then an orientation process is performed onto the alignment material layer (not shown) to form an alignment layer 110. By the orientation process, the alignment layer 110 has properties of the alignment layer 110. The alignment material includes polyimide having cyclobutane dianhydride (CBDA).

When forming the alignment layer 110, it is required to minimize oxidation during photodecomposition and to activate the reaction rate such that the lifetime of maleimide (MI) is minimized and the side reaction from maleimide (MI) is prevented.

To do this, in the orientation process, ultra violet (UV) rays are irradiated onto the alignment material layer (not shown).

At the same time, the alignment material layer (not shown) is heated. Namely, a first condition of the orientation process is to be performed the UV RAY irradiating and heating onto the alignment material layer (not shown) at the same time. The heating process may be called as a pre-baking process. The pre-baking process is performed under a temperature with a range of about 25 centigrade to about 230 centigrade. Due to theses processes, a photo-reaction and a heat cross-linking reaction are simultaneously occurred. Accordingly, when being photodecomposition of the cyclobutane dianhydride (CBDA) group, maleimide (MI) is much produced and activated to from a network structure, and the side reaction of maleimide (MI) is prevented because of the first condition. As a result, problems of the related art, which results from the side reaction of maleimide (MI), are overcome.

Figure 7:
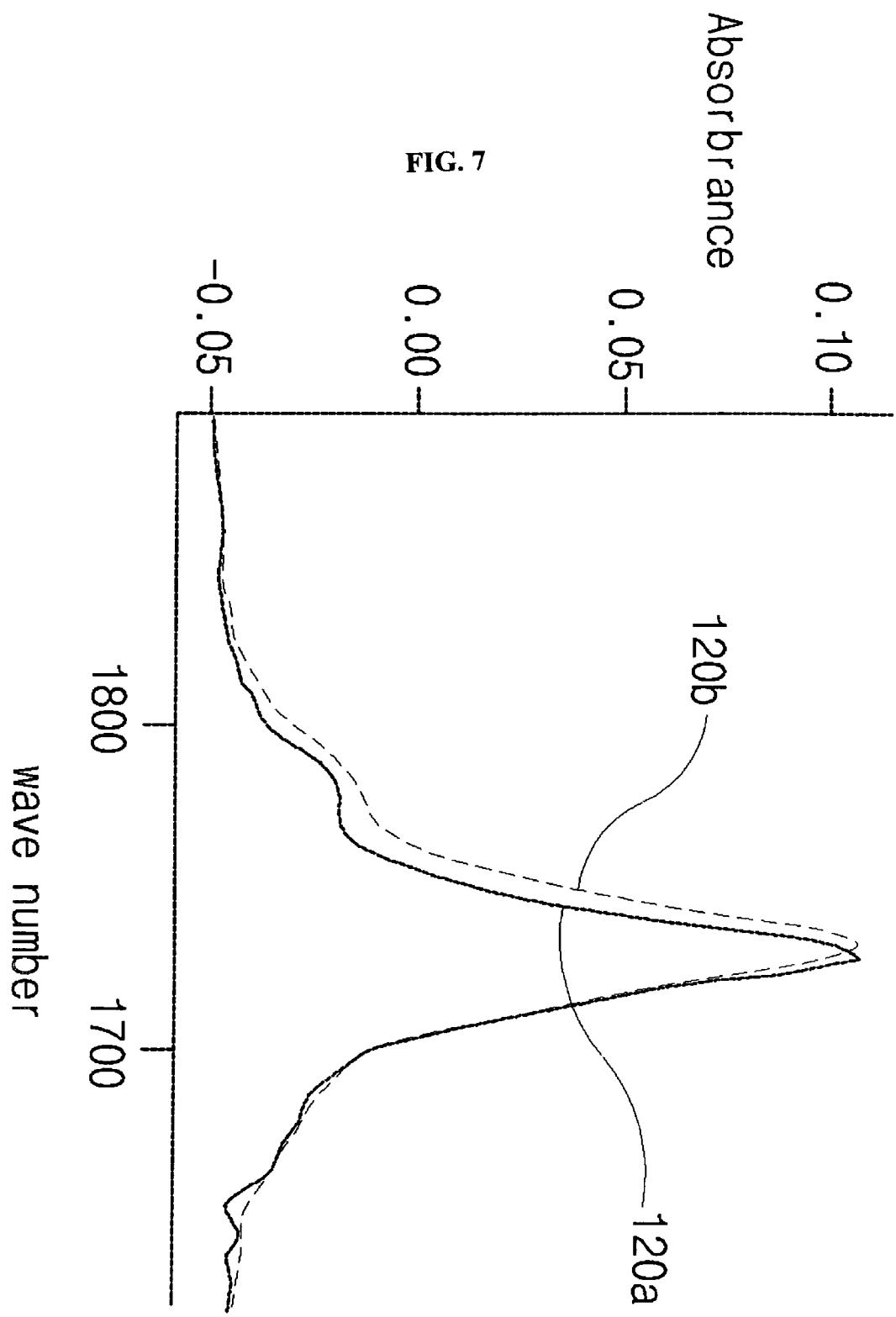
FIG. 7 is a graph showing absorbance of carbonyl groups in an alignment layer.

In addition, a second condition of the orientation process is to be performed under nitrogen rather than under oxygen to minimize oxidation. FIG. 7 is a graph showing absorbance of carbonyl groups in an alignment layer. The numeral number 120a shows a first absorbance graph of carbonyl groups in the alignment layer being oriented under nitrogen, and the numeral number 120b shows a second absorbance graph of carbonyl groups in the alignment layer being oriented under oxygen. As shown in FIG. 7, the second absorbance graph 120b has a width greater than the first absorbance graph 120a. The oxidation is much activated in the orientation process under oxygen than under nitrogen. The oxidation causes a bad affection to orientation properties. Accordingly, the orientation process is preferred to perform under nitrogen rather than oxygen.

Figure 8:
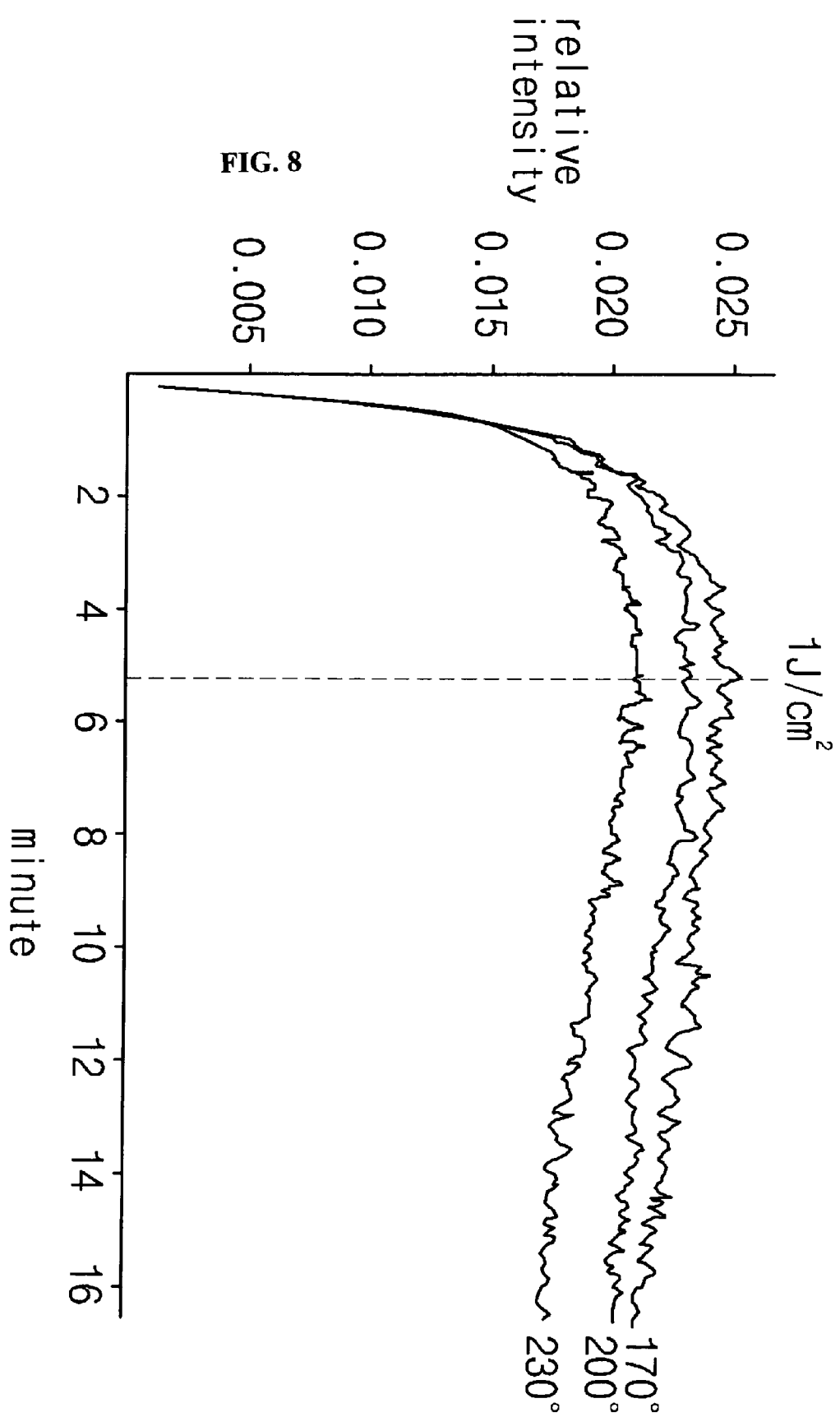
FIG. 8 is a graph showing relative intensity versus time.

A third condition of the orientation process is that the irradiated UV RAY has an energy density with a range of about 0.05 J/cm$^2$ to about 3 J/cm$^2$. This condition is understood by FIG. 8 showing a graph of relative intensity versus time. As shown in FIG. 8, when a temperature of a sample is one of 170 centigrade, 200 centigrade and 230 centigrade and UV energy density is about 1 J/cm$^2$, appearance and disappearance of maleimide (MI) has a equilibrium state. Namely, when the UV energy density has about 1 J/cm$^2$, the production rate of maleimide (NI) has a maximum value. In other energy densities, the production rate is increased such that properties of the alignment layer may be degraded. Accordingly, an energy density is required to be controlled. For example, an energy density has a range of about 0.05 J/cm$^2$ to 3 J/cm$^2$.

Figure 9:
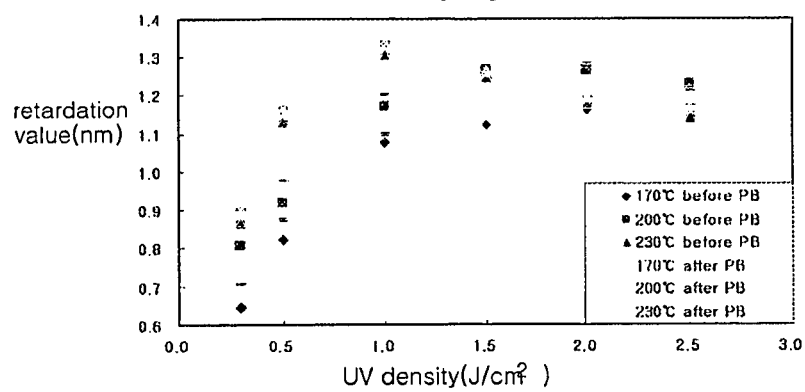
FIG. 9 is a graph showing difference of retardation values depending on UV density before and after post-baking (PB)

A fourth condition of the orientation process is to perform a post-baking process after UV RAY irradiating and heating. If the heating process explained in the first condition is called as a first baking process, the post-baking process may be called as a second baking process. The reason why the second baking process is required is explained with FIG. 9. FIG. 9 is a graph showing difference of retardation values depending on UV density before and after post-baking (PB). As shown in FIG. 9, the alignment layer after the post-baking (PB) process has the retardation value higher than the alignment layer before the post-baking. The higher retardation value the alignment layer has, the higher anisotropic properties the alignment layer has. Accordingly, when the post-baking process is performed, the alignment layer has improved properties.

Figure 10:
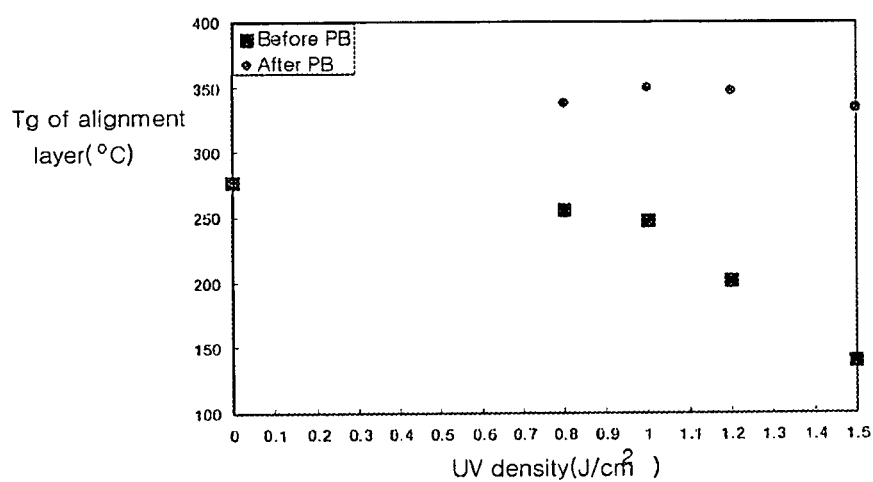
FIG. 10 illustrates a glass transition temperature of an alignment layer depending on UV density before and after the post-baking (PB) process.

Moreover, a temperature property depends on the post-baking process. It is explained with FIG. 10 showing a glass transition temperature of an alignment layer depending on UV density before and after the post-baking (PB) process. As shown in FIG. 10, when UV RAY is irradiated, the alignment layer after the post-baking (PB) process has a glass transition temperature higher than the alignment layer before the post-baking process (PB). It is because the maleimide (MI) has a network structure by the post-baking (PB) process. A temperature of the post-baking process may be a range of about 25 centigrade to about 230 centigrade.

The alignment layer has much improved properties with a cleaning process before the above-mentioned post-baking process. It is because side-reaction products are removed by the cleaning process. In the cleaning process, a cleaning solution may include isopropyl alcohol. The alignment layer is cleaned by the cleaning solution, and then the alignment layer is further cleaned by deionized (DI) water. After cleaning process, the alignment layer is dried.

Black image produced by an LCD device having the alignment layer, which is photo-oriented under the first, second and third conditions, has brightness as shown in Table 1. The brightness of the black image is measured on points 1 to 6 in the alignment layer. Four samples are obtained by a photo-orientation process under different UV energy densities, and fifth sample is a related art polyimide alignment layer rubbed by rubbing clothes is represented by "R/B PI".

TABLE 1

|  |  | UV energy density [J/cm$^2$] | | | | |
| --- | --- | --- | --- | --- | --- | --- |
|  |  | 0.8 | 1.0 | 1.2 | 1.5 | R/B PI |
| Brightness [cd/cm$^2$] | Point 1 | 1.122 | 1.264 | 1.005 | 1.134 | 1.784 |
|  | Point 2 | 1.117 | 0.976 | 1.560 | 1.122 | 1.654 |
|  | Point 3 | 1.204 | 1.574 | 1.016 | 0.986 | 1.584 |
|  | Point 4 | 1.186 | 1.314 | 1.230 | 1.064 | 1.673 |
|  | Point 5 | 1.106 | 1.122 | 1.000 | 1.171 | 1.594 |
|  | Point 6 | 1.125 | 1.218 | 1.064 | 1.027 | 1.740 |
|  | Deviation | 0.041 | 0.201 | 0.220 | 0.070 | 0.101 |
|  | Average | 1.143 | 1.244 | 1.146 | 1.084 | 1.674 |

In the table 1, a black image of the LCD device having the photo-oriented alignment layer according to the present invention has brightness of about 1.1 to about 1.2, while a black image of the LCD device having the related art alignment layer has brightness of about 1.6. Since the black image in the LCD device according to the present invention has a relatively low brightness with compared to the black image in the related art LCD device, contrast ratio is improved in the present invention. The relatively high brightness of the black image in the related art LCD device is resulted from scratches by the rubbing clothes in the rubbing process. In the present invention, since the alignment layer is photo-oriented, there is no problem such as the scratches.

As explained above, the alignment material layer including includes a polyimide resin having a cyclobutane dianhydride (CBDA) ring is coated onto the substrate. Under nitrogen, UV rays having an energy density of about 0.05 J/cm2 to about 3 J/cm2 onto the alignment layer, and the pre-baking process is performed onto the alignment layer at the same time. A temperature of the pre-baking process has a range of about 25 centigrade to about 230 centigrade. Next, the substrate having the alignment material layer is cleaned. Finally, the post-baking process is performed under a temperature with a range of about 25 centigrade to about 230 centigrade. Consequently, the alignment layer is fabricated. In this case, the temperature of the pre-baking process and the post-baking process is determined by considering temperature properties of the planarization layer in the color filter substrate. When the planarization layer has excellent temperature properties, the temperature of the pre-baking process and the post-baking process may be increased.

In the present invention, the alignment layer is photo-oriented by UV RAY irradiation. At the same time the pre-baking process is performed. Moreover, since the photo-orientation process is performed under nitrogen, a side reaction is minimized. Accordingly, the alignment layer has improved properties.

In addition, since UV RAY irradiation has a density with a range of about 0.05 J/cm$^2$ to about 3 J/cm$^2$, a production rate of maleimide (MI) is maximized.

Furthermore, a retardation value is increased due to the post-baking process. In addition, since a cleaning process is performed after the pre-baking process and before the post-baking, side reaction products are removed such that properties of the alignment layer are further improved.

It will be apparent to those skilled in the art that various modifications and variations can be made in the organic electroluminescent device and fabricating method thereof of the present invention without departing from the spirit or scope of the invention. Thus, it is intended that the present invention cover the modifications and variations of this invention provided they come within the scope of the appended claims and their equivalents.

What is claimed is:

1. A method of fabricating an alignment layer for a liquid crystal display device, comprising:
    forming an alignment material layer on a substrate by coating an alignment material;
    performing an orientation process to align the alignment material layer comprising:
    irradiating UV rays onto and heating the alignment material layer at the same time;
    cleaning the alignment material layer after the step of irradiating the UV rays and heating; and
    baking the alignment material layer after the step of cleaning,
    wherein the step of irradiating the UV rays and heating is performed under a nitrogen gas, and the UV rays have an energy density with a range of about 0.05 J/cm2 to about 3 J/cm2, and wherein the step of heating is performed under a temperature of about 25 centigrade to about 230 centigrade.

2. The method according to claim 1, wherein the alignment material includes polyimide having cyclobutane dianhydride (CBDA), wherein the polyimide is represented by

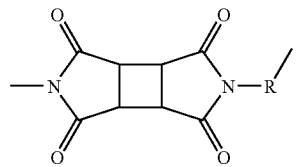

3. The method according to claim 2, wherein R includes one of diamine and an hydride having oxydianiline (ODA).

4. The method according to claim 1, wherein the step of baking is performed under a temperature of about 25 centigrade to about 230 centigrade.

5. The method according to claim 1, wherein a cleaning solution for the step of cleaning includes one of an organic solvent including isopropyl alcohol and a mixture of the organic solvent and a deionized water.

* * * * *